United States Patent
Uchiyama et al.

(10) Patent No.: US 7,116,445 B2
(45) Date of Patent: Oct. 3, 2006

(54) IMAGE FORMING APPARATUS AND IMAGE FORMING METHOD

(75) Inventors: Akihiko Uchiyama, Shizuoka (JP); Hiroyuki Yamazaki, Shizuoka (JP); Satoshi Nakashima, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 484 days.

(21) Appl. No.: 10/770,537

(22) Filed: Feb. 4, 2004

(65) Prior Publication Data

US 2004/0155916 A1 Aug. 12, 2004

(30) Foreign Application Priority Data

Feb. 12, 2003 (JP) .............. 2003-034341

(51) Int. Cl.
*G06K 15/00* (2006.01)
(52) U.S. Cl. .................... 358/3.06; 358/3.3
(58) Field of Classification Search ............ 358/3.06, 358/3.3, 3.03, 3.26, 448, 463
See application file for complete search history.

(56) References Cited

U.S. PATENT DOCUMENTS

| | | | |
|---|---|---|---|
| 6,384,935 B1 | 5/2002 | Yamazaki | 358/1.9 |
| 2001/0002827 A1 | 6/2001 | Yamazaki et al. | 345/82 |
| 2003/0164967 A1* | 9/2003 | Norimatsu | 358/1.9 |
| 2004/0049497 A1* | 3/2004 | Curry et al. | 707/3 |
| 2004/0052429 A1* | 3/2004 | Curry et al. | 382/274 |
| 2004/0056835 A1* | 3/2004 | Curry et al. | 345/100 |
| 2006/0103688 A1* | 5/2006 | Hirano | 347/15 |
| 2006/0104538 A1* | 5/2006 | Izumi | 382/275 |

FOREIGN PATENT DOCUMENTS

| | | | |
|---|---|---|---|
| EP | 0918349 | * | 5/1999 |
| JP | 4-276981 | * | 10/1992 |

* cited by examiner

*Primary Examiner*—Jerome Grant, II
(74) *Attorney, Agent, or Firm*—Fitzpatrick, Cella, Harper & Scinto

(57) ABSTRACT

An object of this invention is to eliminate graininess caused by superposition of noise on an image reproduced as a hard copy. To achieve this object, this invention provides an image forming apparatus which forms an image corresponding to bitmap image data, including a determination unit which determines from the bitmap image data an image data area where a noise component is superposed, and an image processing unit which performs halftone processing for the bitmap image data so as to decrease the resolution in at least a predetermined direction for the image data area where the noise component is superposed, in comparison with an image data area where no noise component is superposed. More preferably, image formation based on the bitmap image data having undergone halftone processing by the image processing unit is performed by electrophotography, and the image processing unit performs halftone processing by using as the predetermined direction a scanning direction in forming a latent image with a light beam. Alternatively, the image processing unit performs halftone processing by dithering, and uses a threshold matrix having a matrix size larger in at least the predetermined direction for the image data area where the noise component is superposed, in comparison with the image data area where no noise component is superposed.

24 Claims, 15 Drawing Sheets

BITMAP IMAGE DATA

FIG. 11A

| 7 | 8 | 9 | 10 | 7 | 8 | 9 | 10 | 7 | 8 | 9 | 10 | 7 | 8 | 9 |
|---|---|---|---|---|---|---|---|---|---|---|---|---|---|---|
| 6 | 1 | 2 | 11 | 6 | 1 | 2 | 11 | 6 | 1 | 2 | 11 | 6 | 1 | 2 |
| 5 | 4 | 3 | 12 | 5 | 4 | 3 | 12 | 5 | 4 | 3 | 12 | 5 | 4 | 3 |
| 16 | 15 | 14 | 13 | 16 | 15 | 14 | 13 | 16 | 15 | 14 | 13 | 16 | 15 | 14 |
| 7 | 8 | 9 | 10 | 7 | 8 | 9 | 10 | 7 | 8 | 9 | 10 | 7 | 8 | 9 |
| 6 | 1 | 2 | 11 | 6 | 1 | 2 | 11 | 6 | 1 | 2 | 11 | 6 | 1 | 2 |
| 5 | 4 | 3 | 12 | 5 | 4 | 3 | 12 | 5 | 4 | 3 | 12 | 5 | 4 | 3 |
| 16 | 15 | 14 | 13 | 16 | 15 | 14 | 13 | 16 | 15 | 14 | 13 | 16 | 15 | 14 |
| 7 | 8 | 9 | 10 | 7 | 8 | 9 | 10 | 7 | 8 | 9 | 10 | 7 | 8 | 9 |
| 6 | 1 | 2 | 11 | 6 | 1 | 2 | 11 | 6 | 1 | 2 | 11 | 6 | 1 | 2 |
| 5 | 4 | 3 | 12 | 5 | 4 | 3 | 12 | 5 | 4 | 3 | 12 | 5 | 4 | 3 |
| 16 | 15 | 14 | 13 | 16 | 15 | 14 | 13 | 16 | 15 | 14 | 13 | 16 | 15 | 14 |
| 7 | 8 | 9 | 10 | 7 | 8 | 9 | 10 | 7 | 8 | 9 | 10 | 7 | 8 | 9 |
| 6 | 1 | 2 | 11 | 6 | 1 | 2 | 11 | 6 | 1 | 2 | 11 | 6 | 1 | 2 |
| 5 | 4 | 3 | 12 | 5 | 4 | 3 | 12 | 5 | 4 | 3 | 12 | 5 | 4 | 3 |
| 16 | 15 | 14 | 13 | 16 | 15 | 14 | 13 | 16 | 15 | 14 | 13 | 16 | 15 | 14 |

FIG. 11B

| 8 | 3 | 9 | 8 | 3 | 9 | 8 | 3 | 9 | 8 | 3 | 9 | 8 | 3 | 9 |
|---|---|---|---|---|---|---|---|---|---|---|---|---|---|---|
| 7 | 2 | 6 | 7 | 2 | 6 | 7 | 2 | 6 | 7 | 2 | 6 | 7 | 2 | 6 |
| 4 | 1 | 5 | 4 | 1 | 5 | 4 | 1 | 5 | 4 | 1 | 5 | 4 | 1 | 5 |
| 8 | 3 | 9 | 8 | 3 | 9 | 8 | 3 | 9 | 8 | 3 | 9 | 8 | 3 | 9 |
| 7 | 2 | 6 | 7 | 2 | 6 | 7 | 2 | 6 | 7 | 2 | 6 | 7 | 2 | 6 |
| 4 | 1 | 5 | 4 | 1 | 5 | 4 | 1 | 5 | 4 | 1 | 5 | 4 | 1 | 5 |
| 8 | 3 | 9 | 8 | 3 | 9 | 8 | 3 | 9 | 8 | 3 | 9 | 8 | 3 | 9 |
| 7 | 2 | 6 | 7 | 2 | 6 | 7 | 2 | 6 | 7 | 2 | 6 | 7 | 2 | 6 |
| 4 | 1 | 5 | 4 | 1 | 5 | 4 | 1 | 5 | 4 | 1 | 5 | 4 | 1 | 5 |
| 8 | 3 | 9 | 8 | 3 | 9 | 8 | 3 | 9 | 8 | 3 | 9 | 8 | 3 | 9 |
| 7 | 2 | 6 | 7 | 2 | 6 | 7 | 2 | 6 | 7 | 2 | 6 | 7 | 2 | 6 |
| 4 | 1 | 5 | 4 | 1 | 5 | 4 | 1 | 5 | 4 | 1 | 5 | 4 | 1 | 5 |
| 8 | 3 | 9 | 8 | 3 | 9 | 8 | 3 | 9 | 8 | 3 | 9 | 8 | 3 | 9 |

IMAGE FORMING APPARATUS AND IMAGE FORMING METHOD

FIELD OF THE INVENTION

The present invention relates to an image forming apparatus and, more particularly, to an image forming apparatus and image forming method which quantize a multilevel image and forms it as an image on a medium.

BACKGROUND OF THE INVENTION

In recent years, image forming apparatuses such as a printer and copying machine which print images have greatly advanced in performance. There have also been developed printing methods using various output methods such as a silver halide method, thermal method, electrophotographic method, electrostatic printing method, and ink-jet method. Such image forming apparatuses can obtain a high-quality image and are very popular. Also, the image processing technique has remarkably been developed, and various methods are adopted for high image quality.

In general, image data input to an image forming apparatus is multilevel data of about 8 bits/pixel. To output such image data from the image forming apparatus, the image data must be converted by image processing into a format processible by the image forming apparatus. The image processing technique is called halftone processing or halftoning, and includes binarization processing and multilevel processing in accordance with the form of the image forming apparatus. Typical examples of binarization processing are error diffusion and ordered dithering. In particular, an electrophotographic image forming apparatus generally employs ordered dithering (to be referred to as dithering hereinafter) in terms of high resolution and low cost of the printing apparatus and the like.

However, dithering can express only two gray levels per pixel, and the matrix size must be increased to fully express grayscale such as halftone. This seriously decreases the resolution and image quality. To solve this problem, dithering using a submatrix has been proposed, but is not an ultimate solution.

In this situation, in an electrophotographic image forming apparatus adopting a scanner as an exposure apparatus, multilevel processing called PWM (Pulse Width Modulation) has been proposed as a method of expressing halftone at high resolution. In PWM, input multilevel image data is converted into an analog voltage, and the voltage is compared with a triangular wave. The resultant signal is converted into pulse width data, the data is sent to a laser driving unit, and the laser is caused to emit a beam for a time corresponding to the pulse width. The triangular wave can be regarded as a reference signal representing a binarization threshold.

FIG. 8 shows the PWM principle. The interval between dotted lines along the abscissa in FIG. 8 represents the length of one pixel. The ordinate represents an analog voltage value to each pixel, and corresponds to the density level from the minimum density (00 h) to maximum density (ffh). In PWM, the laser emits a beam for a time when an analog voltage (image signal) corresponding to each pixel is higher than the voltage of the triangular wave. Only the exposure width in the main scanning direction serving as the scanning direction of the scanner is modulated. In each pixel, toner is applied to only a portion irradiated with a laser beam, and the toner portion is printed. In PWM, no modulation is done in the sub-scanning direction, and pixels in the sub-scanning direction are connected to form a linear screen. A screen angle can also be defined by shifting the triangular wave generation timing by a predetermined amount for each main scanning line.

In an image forming apparatus which prints an image at a high resolution of about 600 dpi, the dot size by the triangular wave as shown in FIG. 8 is very small, and the distance between dots is short. For this reason, satisfactorily stable grayscale cannot be obtained under limitations on process conditions such as the laser spot diameter, toner diameter, and transcription.

As one method of fully expressing grayscale, PWM uses a triangular wave with a wavelength two or three times longer than one pixel, as shown in FIG. 9. Grayscale can be expressed by this PWM of expressing the densities of two or three pixels at once by one dot.

In PWM, the edge of an image easily becomes jagged because of a linear screen, and the resolution is only an integer fraction of the basic resolution of the scanner. For this reason, multilevel dithering is used as another multilevel processing method capable of taking a more flexible arrangement than PWM. In multilevel dithering, at least two thresholds are prepared for each square of a dither matrix, and the number of values (levels) which can be taken by a pixel corresponding to each square after dither processing is three or more (i.e., three levels or more). Each pixel generated by multilevel dithering is printed by PWM shown in FIG. 8, and grayscale is actually visually expressed. FIG. 10 shows an example of forming grayscale dots using multilevel dithering.

In binary dithering which can only express two gray levels per pixel, the dither matrix size must be increased to increase the number of expressible gray levels, decreasing the resolution. In multilevel dithering, one pixel is expressed by at least three values, and the number of gray levels can be increased without increasing the dither matrix size. Multilevel dithering can satisfy both the number of gray levels and high resolution.

A conventional color image forming apparatus uses a dither matrix with a relatively large size in order to give priority to grayscale in an output of a photographic image. However, a large dither matrix size decreases the resolution, the reproducibility of details becomes low, and the dither matrix is seen as a mass. To prevent this, the number of gray levels per pixel of the dither matrix is increased to decrease the dither matrix size and increase the resolution.

For example, dithering using a dither matrix of 8×8 dots capable of expressing four gray levels per pixel has the same grayscale expression ability as that of dithering using a dither matrix of 4×4 dots capable of expressing 13 gray levels per pixel. In this case, when the basic resolution of the scanner of the image forming apparatus is 600 dpi, the dither resolution is 600 dpi/8=75 dpi in the use of an 8×8 dither matrix, and 600 dpi/4=150 dpi in the use of a 4×4 dither matrix. Even with the same number of gray levels, the latter can reproduce an image at a resolution which is double that of the former.

When an image is reproduced and output using a high-resolution dither matrix, a uniform highlight portion which appears on the background of a photographic image photographed by a digital camera or a gradational highlight portion becomes a grainy image, degrading the image quality. Graininess tends to further stand out when high-resolution multilevel dithering is used to output a fine photographic image, because of the following cause.

A digital camera generally uses a CCD (Charge Coupled Device) as an image sensing element. In the CCD, generation of dark current noise is inevitable. In practice, a dark current noise value is superposed on image data at a highlight portion which seems uniform at a glance or a gradational highlight portion which seems to change stepwise. This leads to image data which contains noise changing slightly at random from original image data.

In a high-resolution multilevel dither matrix, the number of gray levels expressed by one pixel increases, low-density grayscale is expressed by a small toner application amount, and the dot reproducibility becomes unstable. A highlight portion is readily influenced by unstable dots, the density does not linearly change in correspondence with a change in image data, and the density varies in uniform image data.

Variations in image data by noise at the highlight portion of a digital camera image and unstableness of the toner application amount at the highlight portion of a high-resolution dither matrix interfere with each other. Density variations become uneven, outputting a low-quality grainy image.

SUMMARY OF THE INVENTION

The present invention has been made in consideration of the above situation, and has as its object to provide an image forming apparatus and image forming method capable of outputting a photographic image as a high-quality image free from any graininess.

To achieve the above object, the present invention has the following arrangement.

According to an aspect of the present invention, an image forming apparatus which forms an image corresponding to bitmap image data, comprises a determination unit which determines from the bitmap image data an image data area where a noise component is superposed; and an image processing unit which performs halftone processing for the bitmap image data so as to decrease a resolution in at least a predetermined direction for the image data area where the noise component is superposed, in comparison with an image data area where no noise component is superposed.

With this arrangement, the present invention performs halftone processing by decreasing the resolution particularly in a predetermined direction for a highlight area which is contained in an image formed from a bitmap object such as a photographic image and contains a noise component, in comparison with the remaining area. The present invention can always output a high-quality image free from any graininess even when a photographic image is output.

Preferably, according to the present invention, the image formation based on the bitmap image data having undergone halftone processing by the image processing unit is performed by electrophotography, and the image processing unit performs halftone processing by using as the predetermined direction a scanning direction in forming a latent image with a light beam.

With this arrangement, the present invention can eliminate graininess by decreasing the resolution in the light beam scanning direction when an image is formed by electrophotography.

Preferably, according to the present invention, the image processing unit performs halftone processing by dithering, and uses a threshold matrix having a matrix size larger in at least the predetermined direction for the image data area where the noise component is superposed, in comparison with the image data area where no noise component is superposed.

With this arrangement, the present invention can eliminate graininess by decreasing the resolution of a noise-containing area by using for the noise-containing area a matrix size which is larger in at least one direction than a matrix size used for a noise-free area especially when halftone processing is done using dithering.

Preferably, according to the present invention, the image processing unit performs halftone processing by pulse width modulation, and uses a reference signal having a longer wavelength for the image data area where the noise component is superposed, in comparison with the image data area where no noise component is superposed.

With this arrangement, the present invention can eliminate graininess by decreasing the resolution of a noise-containing area by setting the wavelength of a reference signal used for the noise-containing area to be longer than that of a reference signal used for a noise-free area especially when halftone processing is performed by pulse width modulation.

Preferably, according to the present invention, the determination unit determines for the bitmap image data an area where a noise component is superposed, in accordance with whether an average value and a standard deviation of a value of a pixel whose value falls within a predetermined range correspond to predetermined values.

With this arrangement, the present invention can determine a noise-containing area in a bitmap image.

Preferably, according to the present invention, the image forming apparatus further comprises a rasterizer which generates bitmap data on the basis of input object data, and the determination unit determines an area where a noise component is superposed, for bitmap image data generated from a bitmap object.

With this arrangement, the present invention can efficiently determine a noise-containing area in a bitmap image for a portion which may contain noise in the image.

Preferably, according to the present invention, the bitmap image data is given for each color component, and the determination unit and the image processing unit perform processes for each color component.

With this arrangement, also for a color image, the present invention can form a high-quality image from which graininess is eliminated for each color component.

With this arrangement, the present invention can eliminate graininess of a noise-containing area by using pulse width modulation for the noise-containing area and dithering for a noise-free area.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 11A and 11B are views showing an example of a threshold matrix used in dither processing;

DETAILED DESCRIPTION OF THE PREFERRED EMBODIMENTS

Preferred embodiments of the present invention will be described below with reference to the accompanying drawings. In the following description, the present invention is applied to a color image forming apparatus using electrophotography. In the embodiments, an image signal of 8 bits/pixel is input, and the input density level is 0 to 255. The image forming apparatus outputs a solid white image at input density level 0 and a solid black image at 255.

First Embodiment

Figure 1:
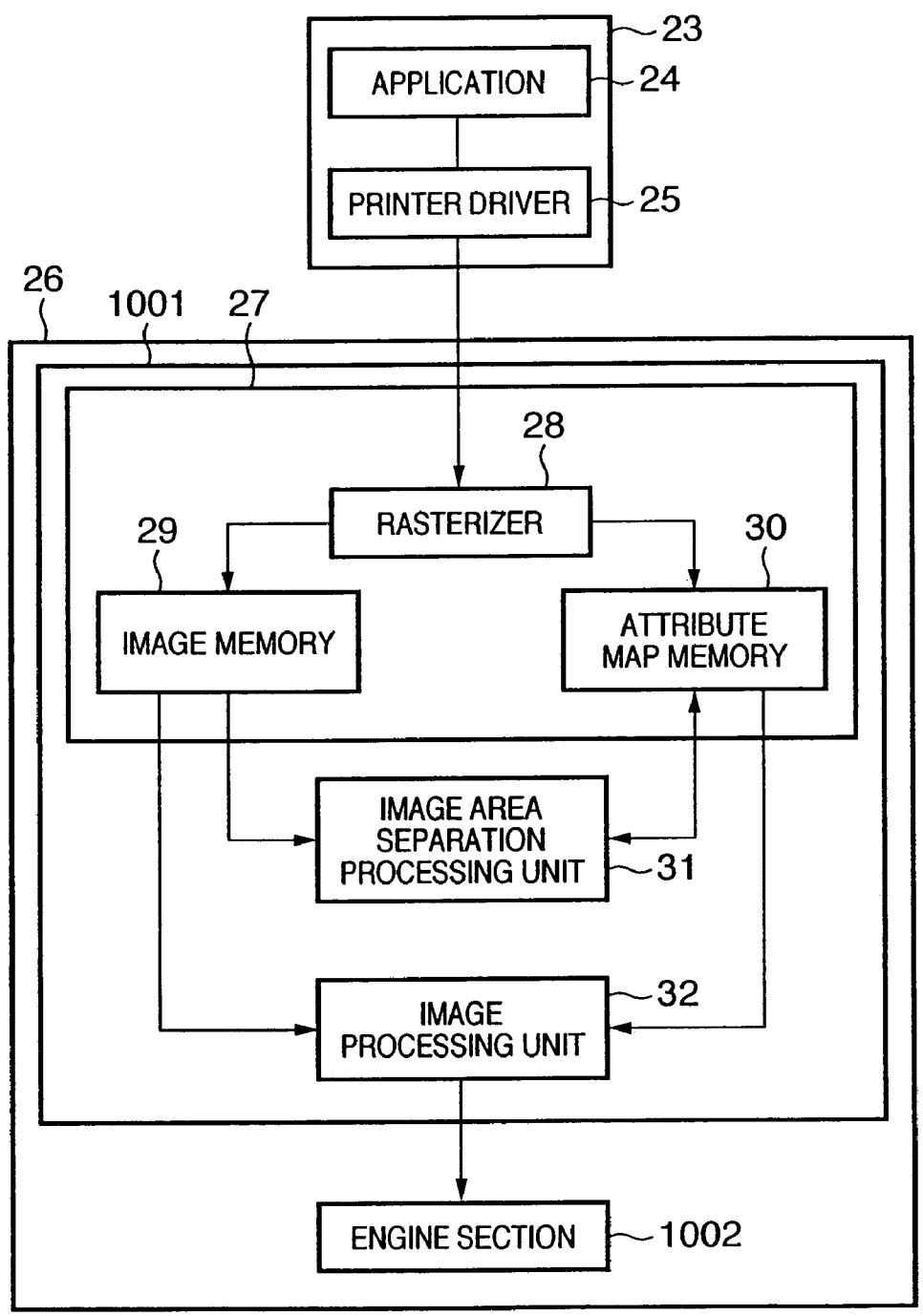
FIG. 1 is a block diagram showing the schematic arrangement of an image forming apparatus according to the first embodiment.

FIG. 1 is a block diagram showing the configuration of an image processing system according to the first embodiment. A host computer 23 is connected to a color printer (image forming apparatus) 26. An application 24 is an application such as document processing software, draw software, or graphic software executed by the host computer 23. The host computer 23 executes a printer driver 25 which interfaces the color image forming apparatus 26 when the application 24 outputs a character, graphic, or bitmap image to the color image forming apparatus 26.

The color image forming apparatus 26 is comprised of a controller section 1001 and engine section 1002. In the controller section 1001, a raster image processor 27 rasterizes data output via the printer driver 25 into image data. The raster image processor 27 incorporates a rasterizer 28, an image memory 29 for storing image data, and an attribute map memory 30.

An image area separation processing unit 31 performs image area separation processing of separating image data stored in the image memory 29 for each attribute in accordance with an attribute map (to be described later) stored in the attribute map memory 30. An image processing unit 32 performs halftone processing in order to convert image data stored in the image memory 29 into image data which can be output from the engine section 1002. The image processing unit 32 executes different halftone processes for respective image areas separated by the image area separation processing unit 31. Processing performed in the controller section 1001 may be performed in the host computer 23.

<Arrangement of Engine Section>

Figure 2:
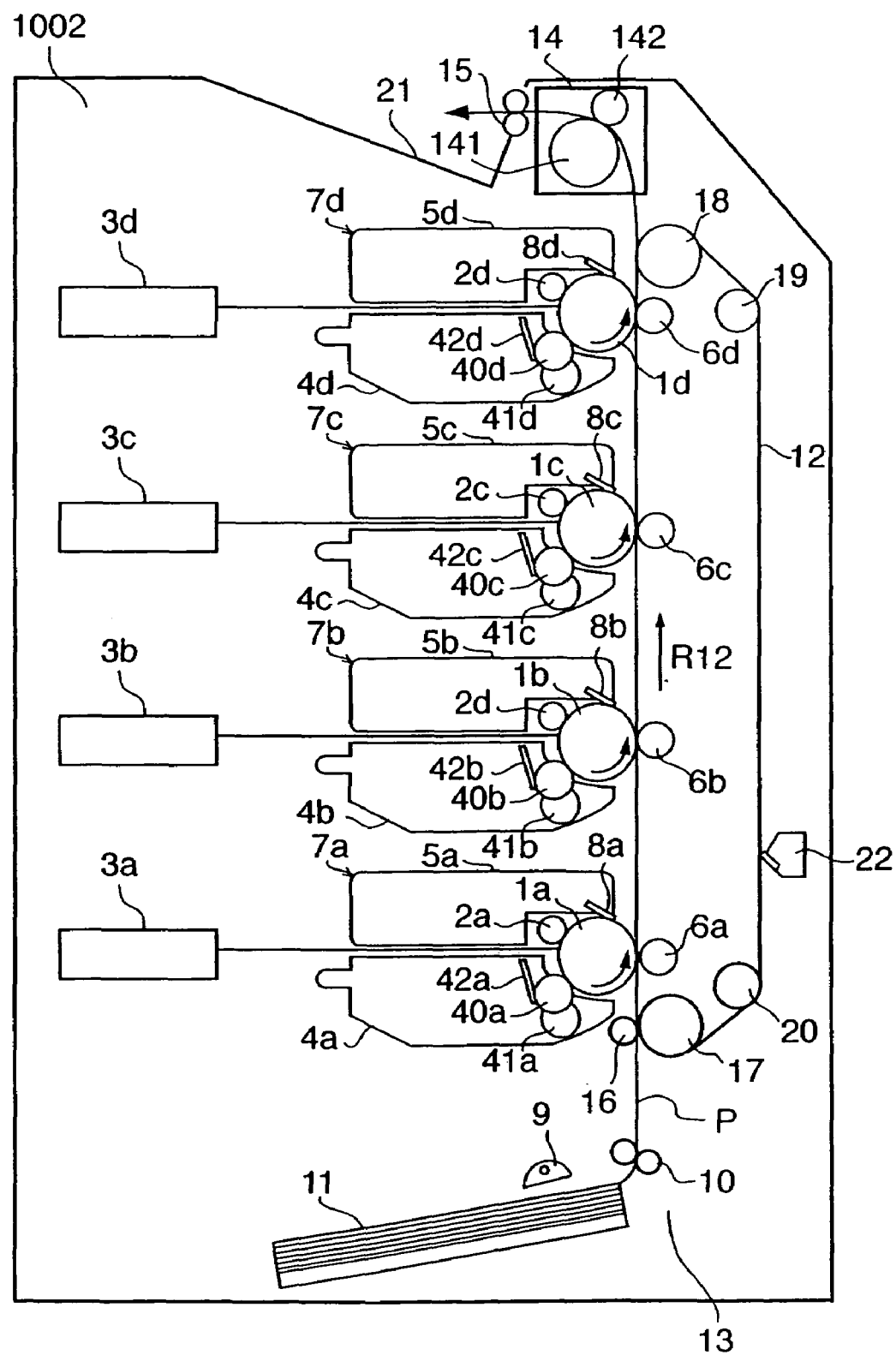
FIG. 2 is a longitudinal sectional view showing the schematic arrangement of the engine section of the image forming apparatus according to the first embodiment.

FIG. 2 is a view showing the arrangement of the engine section 1002. The arrangement of the engine section 1002 and general image formation operation will be explained with reference to FIG. 2.

The engine section 1002 comprises process cartridges 7a, 7b, 7c, and 7d freely detachable from the main body. These four process cartridges 7a, 7b, 7c, and 7d have the same structure except that they form images by toners of different colors: cyan (C), magenta (M), yellow (Y), and black (Bk). The process cartridges 7a, 7b, 7c, and 7d are comprised of drum units 5a, 5b, 5c, and 5d, and developing units 4a, 4b, 4c, and 4d. The drum units 5a, 5b, 5c, and 5d comprise photosensitive drums 1a, 1b, 1c, and 1d serving as image carriers, charging rollers 2a, 2b, 2c, and 2d, cleaning blades 8a, 8b, 8c, and 8d, and a waste toner vessel.

The developing units 4a, 4b, 4c, and 4d comprise developing rollers 40a, 40b, 40c, and 40d, developer mix spreading rollers 41a, 41b, 41c, and 41d, and developer mix spreading blades 42a, 42b, 42c, and 42d.

Scanner units 3a, 3b, 3c, and 3d are arranged in almost the horizontal directions of the process cartridges 7a, 7b, 7c, and 7d. The scanner units 3a, 3b, 3c, and 3d expose the photosensitive drums 1a, 1b, 1c, and 1d on the basis of image signals sent from the controller section 1001.

The photosensitive drums 1a, 1b, 1c, and 1d are charged to predetermined negative potentials by the charging rollers 2a, 2b, 2c, and 2d, and then electrostatic latent images are formed by the scanner units 3a, 3b, 3c, and 3d. At this time, the surfaces of the photosensitive drums 1a, 1b, 1c, and 1d are scanned by laser beams from the scanner units 3a, 3b, 3c, and 3d. The laser beams are PWM-modulated by image signals, as described with reference to FIG. 8 or 9.

The electrostatic latent images formed on the photosensitive drums 1a, 1b, 1c, and 1d are reversely developed by the developing units 4a, 4b, 4c, and 4d, and negative-polarity toners are attracted to form C, M, Y, and Bk toner images. The toner images formed on the photosensitive drums 1a, 1b, 1c, and 1d are sequentially transferred onto a transfer medium (target transfer medium) P supplied by a paper feed/convey device 13. The paper feed/convey device 13 has a paper feed roller 9 which feeds a transfer medium P from a paper feed cassette 11 for storing transfer media P, and convey rollers 10 which convey the fed transfer medium P. The transfer medium P conveyed by the paper feed/convey device 13 is electrostatically chucked by the surface of an electrostatic transfer belt 12 by a chuck roller 16 to which a bias is applied.

The electrostatic transfer belt 12 is looped between rollers 17, 18, 19, and 20, and rotates in a direction indicated by an arrow R12 with carrying the transfer medium P on the surface. Transfer rollers 6a, 6b, 6c, and 6d are arranged parallel to each other inside the electrostatic transfer belt 12 at positions where the transfer rollers 6a, 6b, 6c, and 6d substantially face the photosensitive drums 1a, 1b, 1c, and 1d. Toner images of C, M, Y, and Bk colors formed on the photosensitive drums 1a, 1b, 1c, and 1d are sequentially transferred and superposed onto the transfer medium P on the electrostatic transfer belt 12 upon application of a positive bias to the transfer rollers (transfer members) 6a, 6b, 6c, and 6d. The transfer medium P after transfer of the toner images is separated from the electrostatic transfer belt 12, conveyed to a fixing device 14, and heated and pressed by a fixing roller 141 and press roller 142, thereby fixing the toner images on the surface of the transfer medium P. The image-fixed transfer medium P is discharged to a delivery tray 21 via a pair of delivery rollers 15.

Toners left on the surfaces of the photosensitive drums 1*a*, 1*b*, 1*c*, and 1*d* after transfer of the toner images are removed by the cleaning blades 8*a*, 8*b*, 8*c*, and 8*d*. Toner left on the electrostatic transfer belt 12 after separation of the transfer medium P is removed by a transfer belt cleaning device 22.

The arrangement and operation of the engine section 1002 have been described. The internal operation of the controller section 1001 will be explained.

<Arrangement of Controller Section>

Document data created by the application 24 is generally converted into a command string expressed by a PDL (Page Description Language) command system by the printer driver 25 in printing. The converted data is sent to the color image forming apparatus 26. In general, the PDL is roughly formed from three objects. The first object is a character object. The second object is a graphic object such as vector (Vector) data including a graphic and free-form curve. The third object is a bitmap (Bitmap) object such as image data obtained by reading a photograph or printed material by a scanner or image data photographed by a digital camera. The character object and graphic object will also be called vector objects.

The PDL expression of these objects is formed by, for, e.g., a character object, data containing parameters such as a command representing that the target object is a character object, a character code for identifying the character, a font which defines the character shape, size information representing the character size, and color information representing the character color. The PDL expression is not information directly processed by the engine section 1002.

Data sent from the host computer 23 to the controller section 1001 can take various colorimetric systems such as the RGB calorimetric system, CMYBk colorimetric system, and L*c*h colorimetric system. To the contrary, the colorimetric system processible by the engine section 1002 is generally the CMYBk colorimetric system. For this reason, the rasterizer 28 of the controller section 1001 converts a command string sent from the host computer 23 into two-dimensional bitmap image data of C, M, Y, and Bk properly processible by the engine section 1002. The converted data is stored in the image memory 29. In the first embodiment, the rasterizer 28 further creates two-dimensional data called an attribute map representing attribute information of each pixel in the created two-dimensional bitmap image data, and stores the attribute map in the attribute map memory 30.

The attribute map in the first embodiment has at least 5-bit information for each pixel. The 0th bit is a bitmap flag. A bitmap flag "1" represents that the pixel is contained in a bitmap object, and a bitmap flag "0" represents that the pixel is not contained in a bitmap object, i.e., the pixel is contained in a character or graphic object, or no object exists. The first bit is a C image processing flag, the second bit is an M image processing flag, the third bit is a Y image processing flag, and the fourth bit is a Bk image processing flag. The image processing flag is set for a pixel in a noise-containing image area. The image processing flag will be described in detail. The bits and flags may take another correspondence as far as the meanings of the flags are expressed.

In the above arrangement, when objects described in the PDL are to be converted into two-dimensional bitmap data of C, M, Y, and Bk, the rasterizer 28 determines for each pixel which of character, graphic, and bitmap objects finally generates these data. The rasterizer 28 sets the 0th-bit flag of the attribute map so as to allow making the object correspond to two-dimensional image data. Correspondence between image data and the attribute map can be realized by ensuring memory areas so as to establish correspondence between an address corresponding to each pixel of the bitmap of a created image and an address of the attribute map corresponding to the pixel. With this setting, the address of each pixel of the attribute map can be obtained from the address of each pixel of the bitmap of a generated object. When the generated object is a bitmap object, the "bitmap flag (bit 0)" at an obtained address of the attribute map is marked to generate the attribute map during rasterization.

Figure 3:
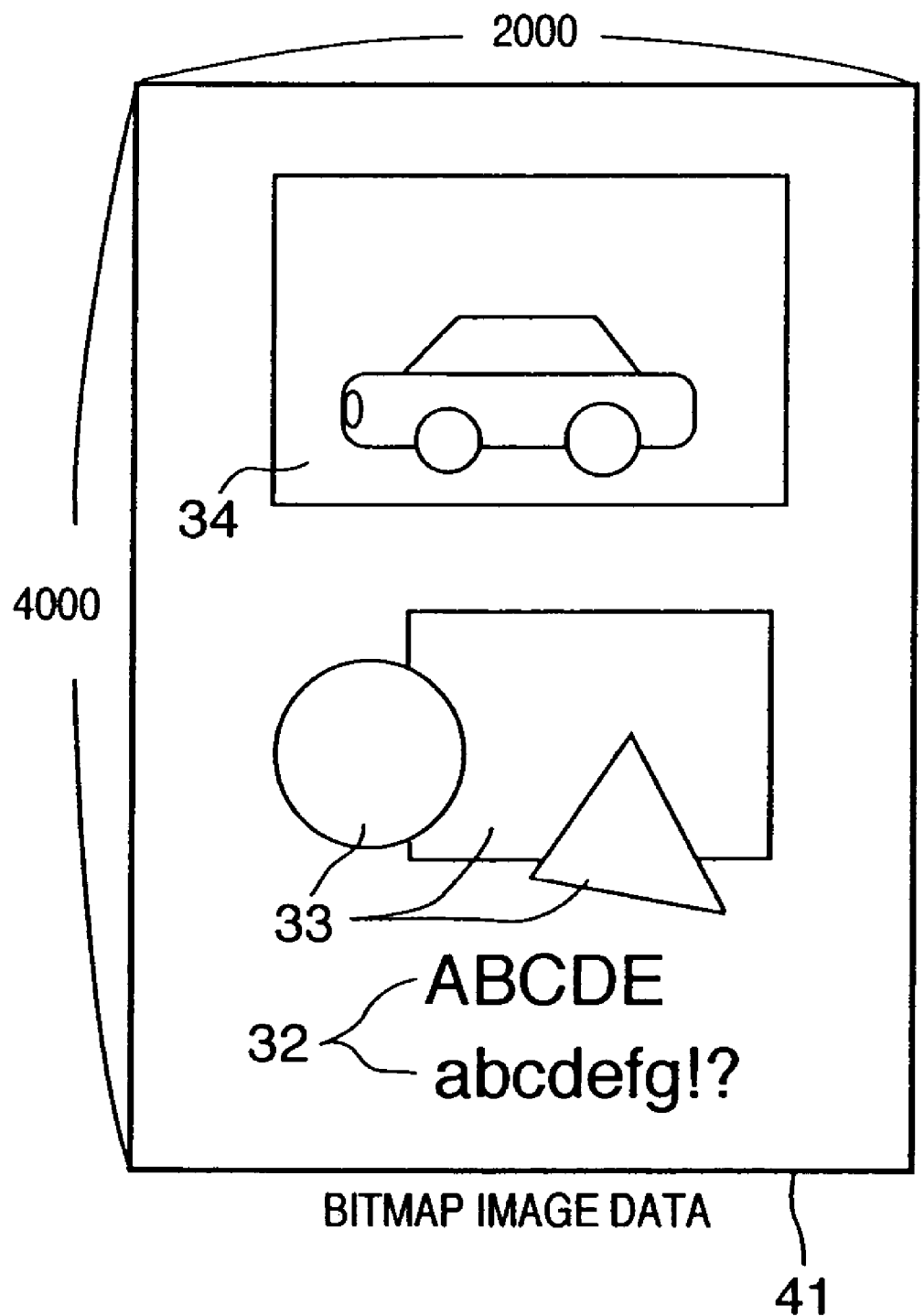
FIG. 3 is a view showing an example of bitmap image data.

Formation of an attribute map will be explained with reference to an example of an image in FIG. 3. An image 41 in FIG. 3 is an image of 2,000 pixels in width and 4,000 pixels in length, and is formed from a character object 32 containing characters and signs, a graphic object 33 containing a graphic, and a bitmap object 34 containing a photographic image. In an attribute map 42 in this case, an area of 2,000 pixels in width and 4,000 pixels in length which are the same as the image is ensured by 5 bits for each pixel. All the bits are initialized to 0.

Figure 4:
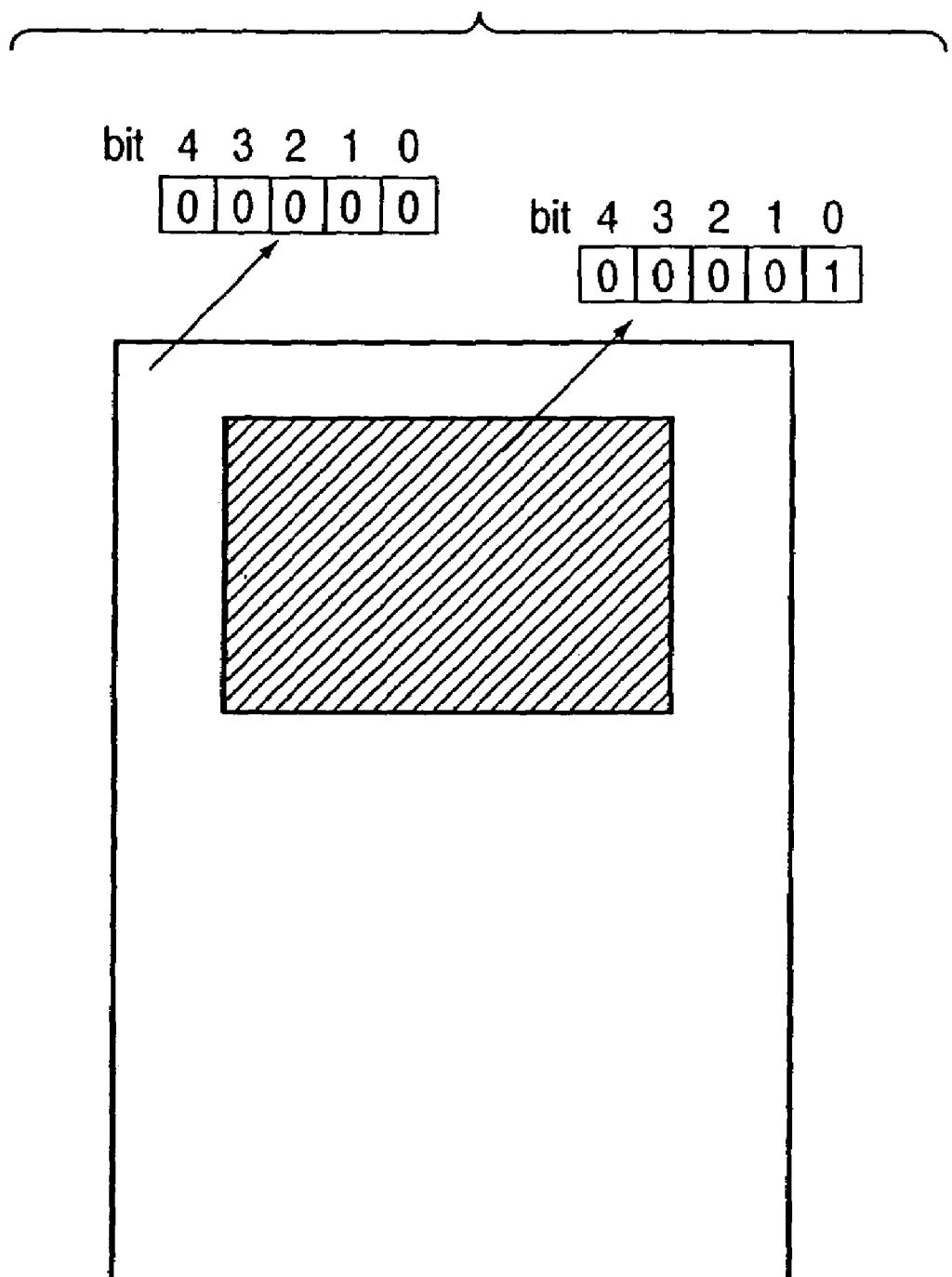
FIG. 4 is a view showing the structure of an attribute map generated from the bitmap image data in FIG. 3.

In FIG. 3, the bitmap object is only the object 34, and the remaining objects are vector objects. Thus, the attribute map has bitmap flags (bit 0) as shown in FIG. 4. That is, 1 is set at the bitmap flag of a black portion corresponding to the photographic image object 34, and 0 is kept set at the bitmap flag of the remaining white portion.

By testing the value of the 0th bit of the attribute map, a pixel of the image 41 in FIG. 3 that is generated from a bitmap object, and a pixel that is generated from a vector object can be easily separated.

As described in BACKGROUND OF THE INVENTION, in the prior art, the highlight portion of a photographic image becomes grainy due to interference between the distribution of a noise component generated by the characteristic of an image sensing element such as a CCD at the highlight portion of the photographic image and the distribution of variations in density caused by a small toner application amount at the highlight portion along with dither processing, thus degrading the image quality.

This phenomenon can be prevented by further stabilizing the dot reproducibility using a low-resolution dither matrix with a small number of gray levels expressed by one pixel and a large matrix size for a noise-containing highlight portion. Stabilization of the dot reproducibility means to express a predetermined input density value (pixel value) by a predetermined toner amount and eliminate variations in density.

This problem can be solved by extracting a highlight portion determined to contain noise at high possibility, from bitmap image data (e.g., an image photographed by a digital camera) generated from a bitmap object, and performing dither processing using a large-size dither matrix for the extracted area. Graininess stands out at a uniform highlight portion or gradational highlight portion. No details need be expressed, and a necessary number of gray levels can be obtained even using a large-size dither matrix without degrading the image quality.

Two-dimensional bitmap image data stored in the image memory 29 and attribute map data stored in the attribute map memory 30 are sent to the image area separation processing unit 31. The image area separation processing unit 31 separates a noise-containing highlight portion from bitmap image data generated from a bitmap object. The image area separation processing unit 31 first separates, from C component data of the two-dimensional bitmap image, an area where the 0th bit (bitmap flag) of the attribute map data is 1, i.e., an area formed from the bitmap object. The image area separation processing unit 31 extracts from this portion an image data area where graininess readily stands out, i.e., pixels having pixel values within a range of 0 to 60. The image area separation processing unit 31 calculates the average pixel value and standard deviation of these pixels.

Dark current noise is considered to comply with the Gaussian distribution, and whether these data exhibit almost the Gaussian distribution can be determined by determining whether the average value and standard deviation fall within predetermined value ranges. When these data exhibit almost the Gaussian distribution, they are determined to contain a noise component. The predetermined value ranges of the average value and standard deviation can be experimentally obtained. For example, an image containing highlight areas with different brightness data is photographed in advance using an image sensing element. Attention is given to a highlight area where graininess stands out and the quality degrades upon printing the image by conventional dither processing. The distribution, average value, and standard deviation of pixel values are calculated from original (photographed) image data of the highlight area of interest. Graininess can be objectively evaluated by, for example, optically reading an output image again and analyzing the spatial frequency of the image, instead of visual check by the observer. Such samples are collected, and the range of pixel values in which graininess degrades an image, the average value of the pixel values, and the standard deviation of the pixel values are stored within a predetermined range in advance in the image forming apparatus. The image area separation processing unit 31 calculates the average value and standard deviation of pixels falling within a predetermined pixel value range (0 to 60 in the above example) out of input image data, and determines whether the calculated average value and standard deviation coincide with those stored in advance. This coincidence is not strict, and whether the average value and standard deviation fall within a given range is determined, as described above.

As for an area where noise components are determined to be distributed, the C component image processing flag as the first bit of an attribute map corresponding to each pixel in the area is set to 1. Similarly, areas where noise is considered to be contained in the M, Y, and Bk planes are separated, and whether noise is contained is determined. As for an area where noise is contained, an image processing flag for each color component of an attribute map corresponding to a pixel in the area is set. Note that the image data range for calculating an average value and standard deviation and the ranges of an average value and standard deviation used to determine a Gaussian distribution may change between colors.

After the image area separation processing unit 31 separates a noise-containing portion and sets the image processing flag, the bitmap image data and attribute map are sent to the image processing unit 32. Halftone processing is performed using large-matrix-size dither for image data whose image processing flag is 1, i.e., a highlight portion which contains a noise component. Halftone processing is performed using small-matrix-size dither for image data whose image processing flag is 0.

If image data having undergone dither processing is multilevel image data, the image is output from the engine section 1002 using PWM processing or the like.

In this manner, dither with a low resolution, i.e., large matrix size is used for only a noise-containing highlight portion at which graininess readily stands out. Dither with a high resolution, i.e., small matrix size is used for the remaining portion. As a result, an image which is reproduced in detail with good graininess can be output even in a photographic image.

<Example of Image Processing>

FIGS. 11A, 11B, 12A, and 12B show an example of binary dither processing in the above arrangement. FIG. 11A shows correspondence between the image and the dither matrix when a low-resolution 4×4 dither matrix is applied to an image of 16×16 pixels. In the 4×4 dither matrix, 7, 6, 5, 16, 8, 1, 4, 15, 9, 2, 3, 14, 10, 11, 12, and 13 are arrayed from the upper left corner to the lower right corner. In the use of the 4×4 dither matrix, 16×16 image data is binarized using the threshold shown in FIG. 11A.

FIG. 11B shows correspondence between the image and the dither matrix when a high-resolution 3×3 dither matrix is applied to an image of 16×16 pixels. In the 3×3 dither matrix, 8, 4, 7, 3, 1, 2, 9, 5, and 6 are arrayed from the upper left corner to the lower right corner. In the use of the 3×3 dither matrix, 16×16 image data is binarized using the threshold shown in FIG. 11B.

Figures 12A, 12B:
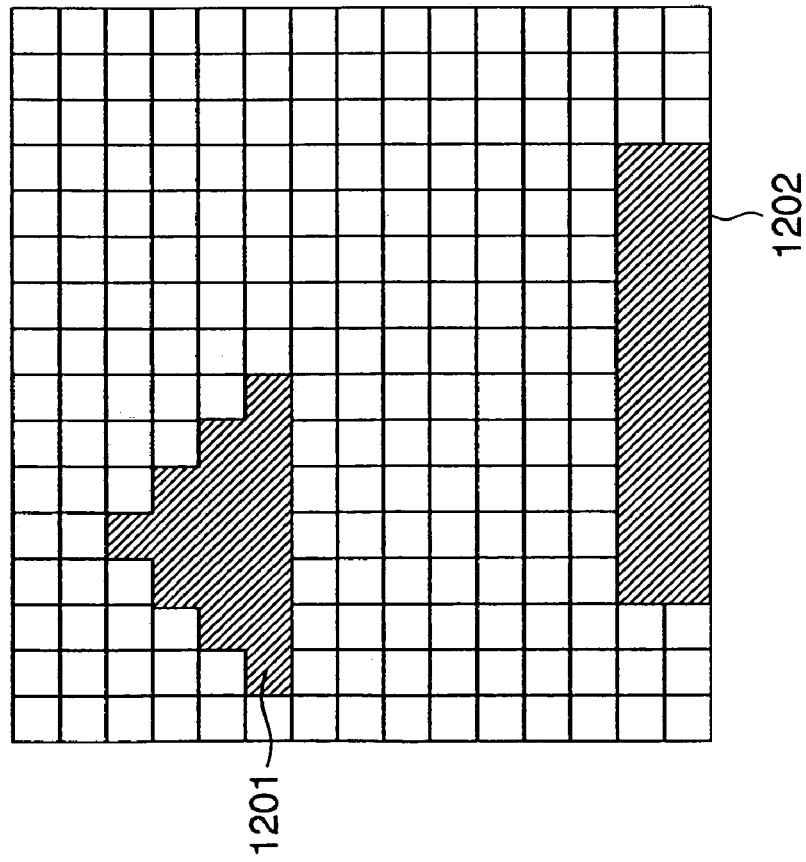
FIGS. 12A and 12B are views showing an example of dither processing in the first and second embodiments.

In contrast to conventional dither processing as shown in FIGS. 11A and 11B, the image forming apparatus according to the first embodiment performs dither processing as shown in FIGS. 12A and 12B. FIG. 12A shows extraction of an image processing flag for one color component from an attribute map generated by the above-described sequence. In FIG. 12A, a triangular area 1201 at an upper left position and a horizontally elongated area 1202 at a lower portion are determined to contain noise. These areas undergo dither processing using a low-resolution 4×4 dither matrix. The remaining area undergoes dither processing using a high-resolution 3×3 dither matrix. FIG. 12B shows correspondence between image data in this case and threshold data of dither processing. The low-resolution matrix in FIG. 11A is applied in FIG. 12B to the areas 1201 and 1202 (FIG. 12A) where the image processing flag is set. The high-resolution matrix in FIG. 11B is applied to the remaining portion.

<Control Sequence of Controller>

Figure 13:
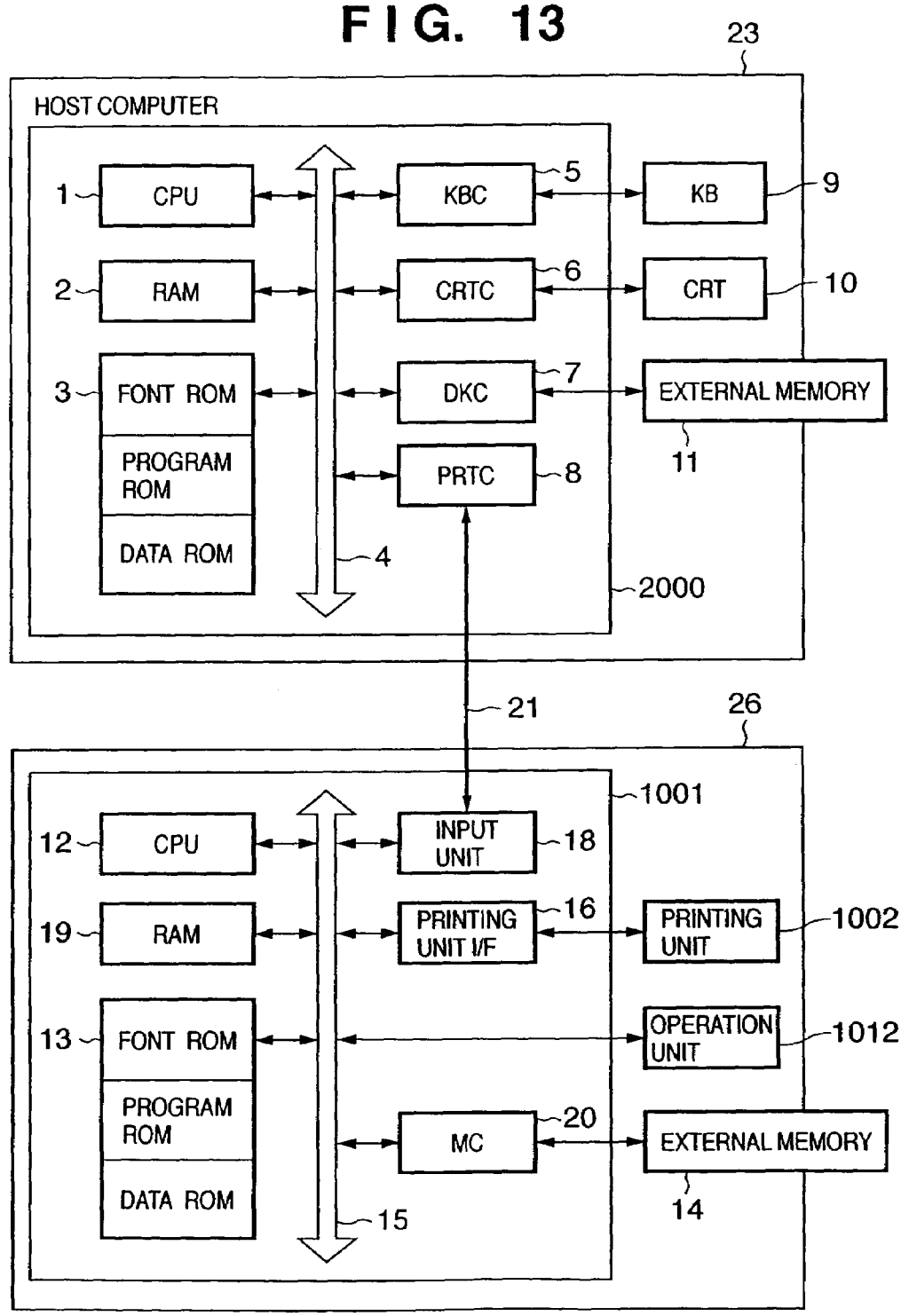
FIG. 13 is a block diagram for realizing the arrangement of the embodiment by a computer.

The above-described arrangement in FIG. 1 can be realized by software when the controller section 1001 which controls the image forming apparatus is formed by a computer. FIG. 13 shows the arrangements of the computer 23 and image forming apparatus (printer) 26 in this case.

In FIG. 13, the host computer 23 comprises a CPU 1 which executes document processing in which figures, images, characters, tables (including spreadsheets and the like), and the like coexist, on the basis of a document processing program or the like stored in the program ROM of the ROM 3. The CPU 1 comprehensively controls devices connected to a system bus 4. A RAM 2 functions as a main memory, work area, or the like for the CPU 1. A keyboard controller (KBC) 5 controls a key input from a keyboard 9 or a pointing device (not shown). A CRT controller (CRTC) 6 controls the display of a CRT display 10. A disk controller (DKC) 7 controls access to an external memory 11 such as a hard disk (HD) or floppy® disk (FD) which stores a boot program, various applications, font data, user files, edited files, and the like. A printer controller (PRTC) 8 is connected to a printer 26 via a predetermined bidirectional interface (bidirectional I/F) 21, and executes communication control processing with the printer 26. The CPU 1 executes, e.g., rasterization processing of an outline font to a display information RAM set in the RAM 2, and enables WYSIWYG (function of making a display content and print content coincide with each other) on the CRT 10. The CPU 1 opens various registered windows and executes various data processes on the basis of commands designated with a mouse cursor (not shown) or the like on the CRT 10.

In the printer 26, a printer CPU 12 comprehensively controls access to various devices connected to a system bus 15 on the basis of control programs and the like stored in the program ROM of a ROM 13. The printer CPU 12 outputs an image signal as output information to a printing unit (printer engine) 1002 connected via a printing unit I/F 16. The CPU 12 can communicate with the host computer via the bidirectional I/F 21, and notify the host computer 23 of internal printer information or the like. A RAM 19 functions as a main memory, work area, or the like for the CPU 12. An input unit 18 can exchange status information such as print status information with the host computer 23 via the bidirectional interface 21, and can notify the host computer 23 of internal printer information or the like. A memory controller (MC) 20 controls access to an external memory 14 such as a hard disk (HD) or floppy® disk which stores a boot program, various applications, font data, user files, edited files, and the like. An operation unit 1012 includes a display panel and keyboard, provides information to the operator, and prompts the operator to input an instruction.

Figure 14:
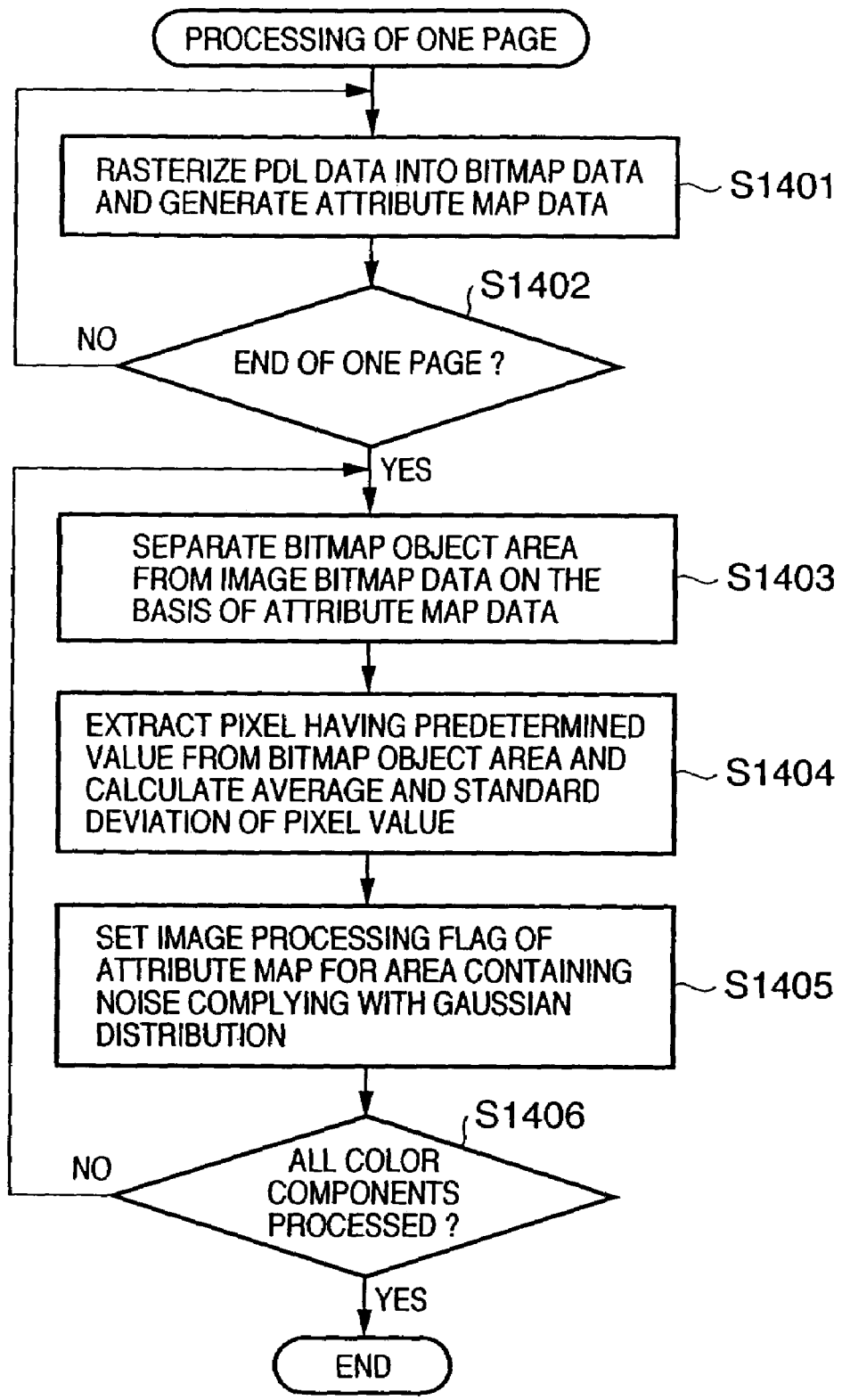
FIG. 14 is a flow chart showing an attribute map generation processing sequence.
Figure 15:
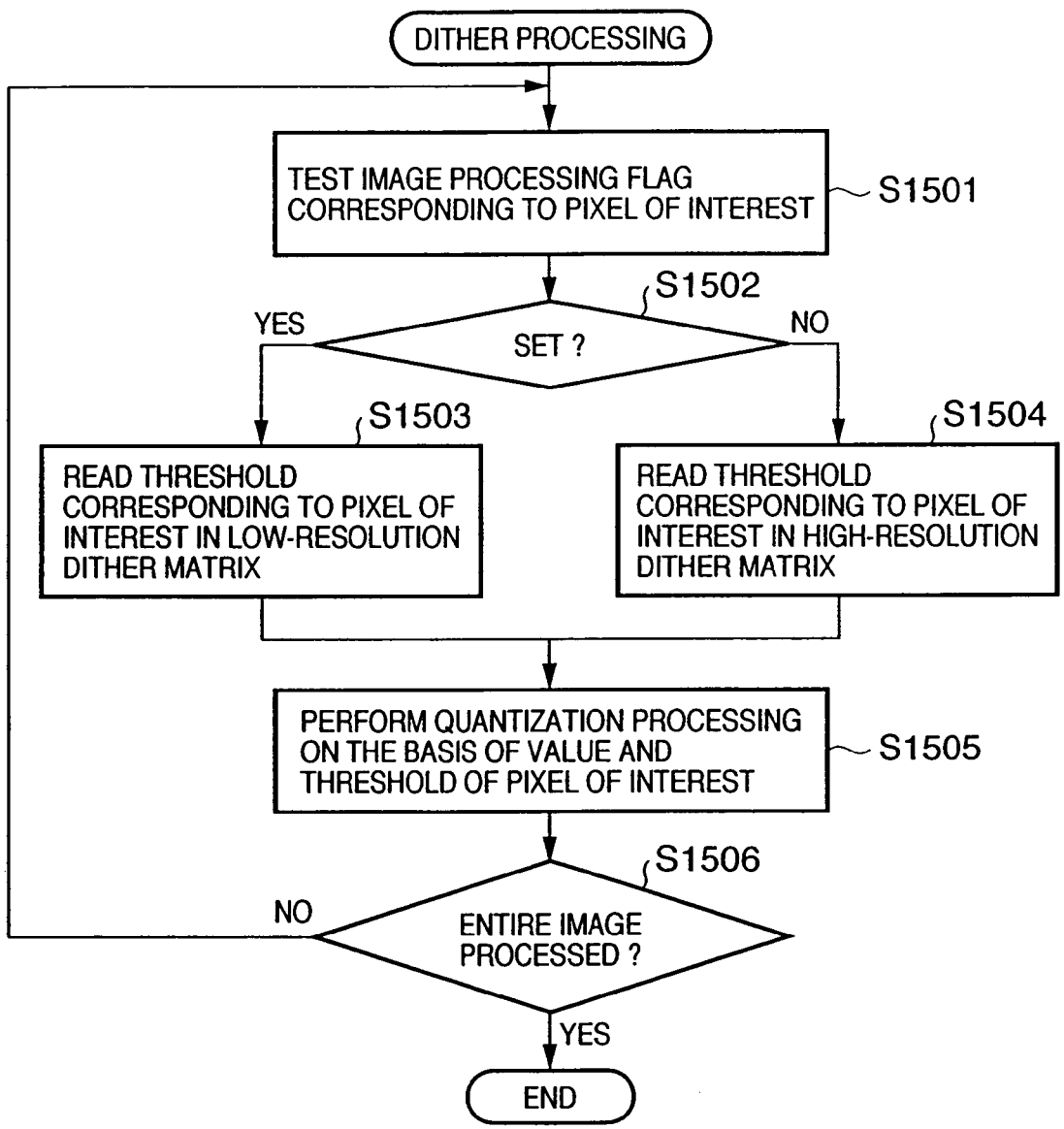
FIG. 15 is a flow chart showing a dither processing sequence.

In this arrangement, the CPU 12 of the image forming apparatus 26 executes sequences shown in FIGS. 14 and 15 to function as the rasterizer 28, image area separation processing unit 31, and image processing unit 32 in FIG. 1. In other words, in FIG. 1, the image area separation processing unit 31 executes the sequence in FIG. 14, and the image processing unit 32 executes the sequence in FIG. 15.

In FIG. 14, the CPU 12 rasterizes PDL data received from the computer 23 into bitmap data, creates attribute map data, and marks the bitmap flag of a pixel corresponding to the bitmap object (S1401). This processing is executed for all objects contained in one page (S1402).

After generation of bitmap data for one page ends, attention is given to a given color component, and an area corresponding to the bitmap flag of the attribute bitmap data, i.e., a bitmap object area is separated from the generated bitmap data (S1403). The bitmap object area suffices to be discriminated from the remaining area. Also in subsequent processing, the bitmap object area need not always be physically separated as far as the attribute flag is referred to. However, when the bitmap object area is moved to a memory area which is physically extracted and separately defined, the attribute map need not be referred to every processing, and processing can be efficiently performed.

Pixels having predetermined values, e.g., pixel values of 0 to 60 are extracted from the bitmap object area, and the average value and standard deviation of pixel values in each area are calculated for successive areas. Since a highlight portion may be separated in a plurality of areas and exists in the image, the position (address) of an extracted pixel in the entire image is stored (S1404).

The calculated average value and standard deviation of each of successive areas are compared with preset values, and if they fall within the value ranges, the area can be determined as a noise-containing highlight area. For the color component of interest, the image processing flag of an attribute bitmap corresponding to an area determined as a noise-containing highlight area is set (S1405).

Whether processes in steps S1403 to S1405 have been done for all color components is determined (S1406), and if YES in step S1406, attribute map generation processing ends.

FIG. 15 is a flow chart showing a sequence of performing dither processing using the attribute map generated by the sequence in FIG. 14. The sequence in FIG. 15 targets one color component, and a color image having a plurality of color components undergoes processing in FIG. 15 for each color component.

The CPU 12 gives attention to the building pixels of bitmap data of an image in, e.g., the raster order, and tests the image processing flag of a corresponding attribute map (S1501).

Whether the image processing flag has been set is determined from the test result (S1502). If YES in step S1502, the pixel is determined to be contained in a noise-containing highlight area, and a low-resolution dither matrix is used. A threshold at a position corresponding to the pixel of interest is read from the low-resolution dither matrix (S1503). The dither matrix is much smaller in size than a normal image, and the corresponding position is determined from successively arranged dither matrices, as shown in FIG. 12B.

If NO in step S1502, a high-resolution dither matrix is applied to the pixel. A threshold at a position corresponding to the pixel of interest is read from the high-resolution dither matrix (S1504).

The pixel value is quantized on the basis of the threshold read in step S1503 or S1504 and the corresponding pixel value (step S1505). For binary dither, the pixel value and threshold are compared, and the pixel value is binarized in accordance with the magnitude relationship. For multilevel dither, the pixel value is quantized in accordance with the magnitude relationship between thresholds and pixel values. Preferably, pixel values belonging to two threshold ends are so quantized as to be given minimum and maximum densities, and pixel values corresponding to intermediate thresholds are so quantized as to be given intermediate values.

In this manner, the entire image is quantized (step S1506).

With this arrangement, the image forming apparatus according to the first embodiment determines a highlight area where a noise component is superposed, from an image formed from a bitmap object such as a photographic image. The image forming apparatus performs halftone processing using a dither matrix whose resolution is decreased in comparison with the remaining area. The image forming apparatus can output a high-quality image free from any graininess even when a photographic image is output.

In the first embodiment, bitmap image data and an attribute map are separately generated. Alternatively, when the rasterizer 28 generates bitmap image data, each of C, M, Y, and Bk colors is compressed from 8 bits to 7 bits, and the remaining 1 bit of each color is first used as an attribute flag. After a noise-containing area is separated by the image area separation processing unit, the attribute flag is used as an image processing flag. In this case, no attribute map need be newly used.

Second Embodiment

Figure 5:
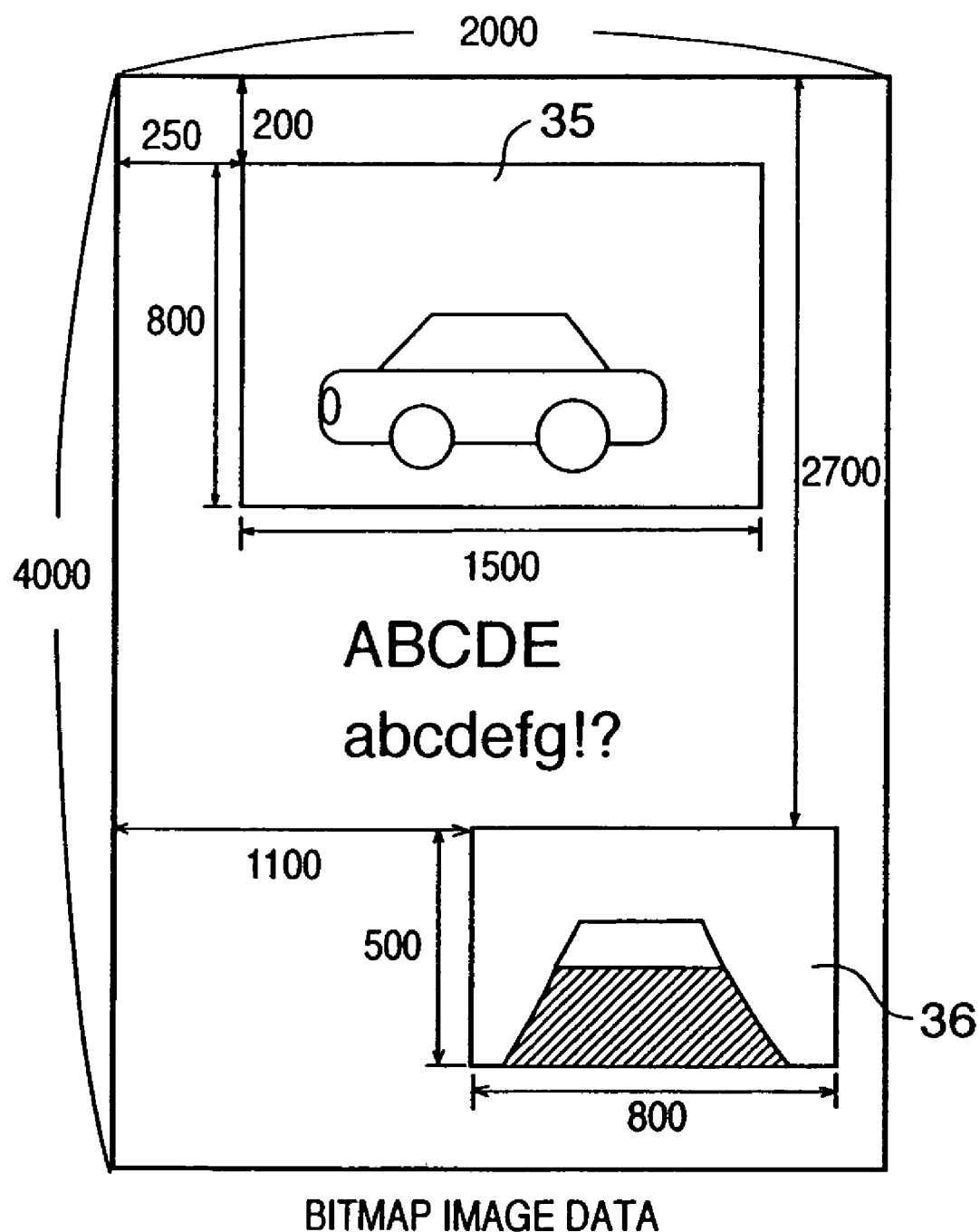
FIG. 5 is a view showing an example of bitmap image data according to the second embodiment.
Figure 6:
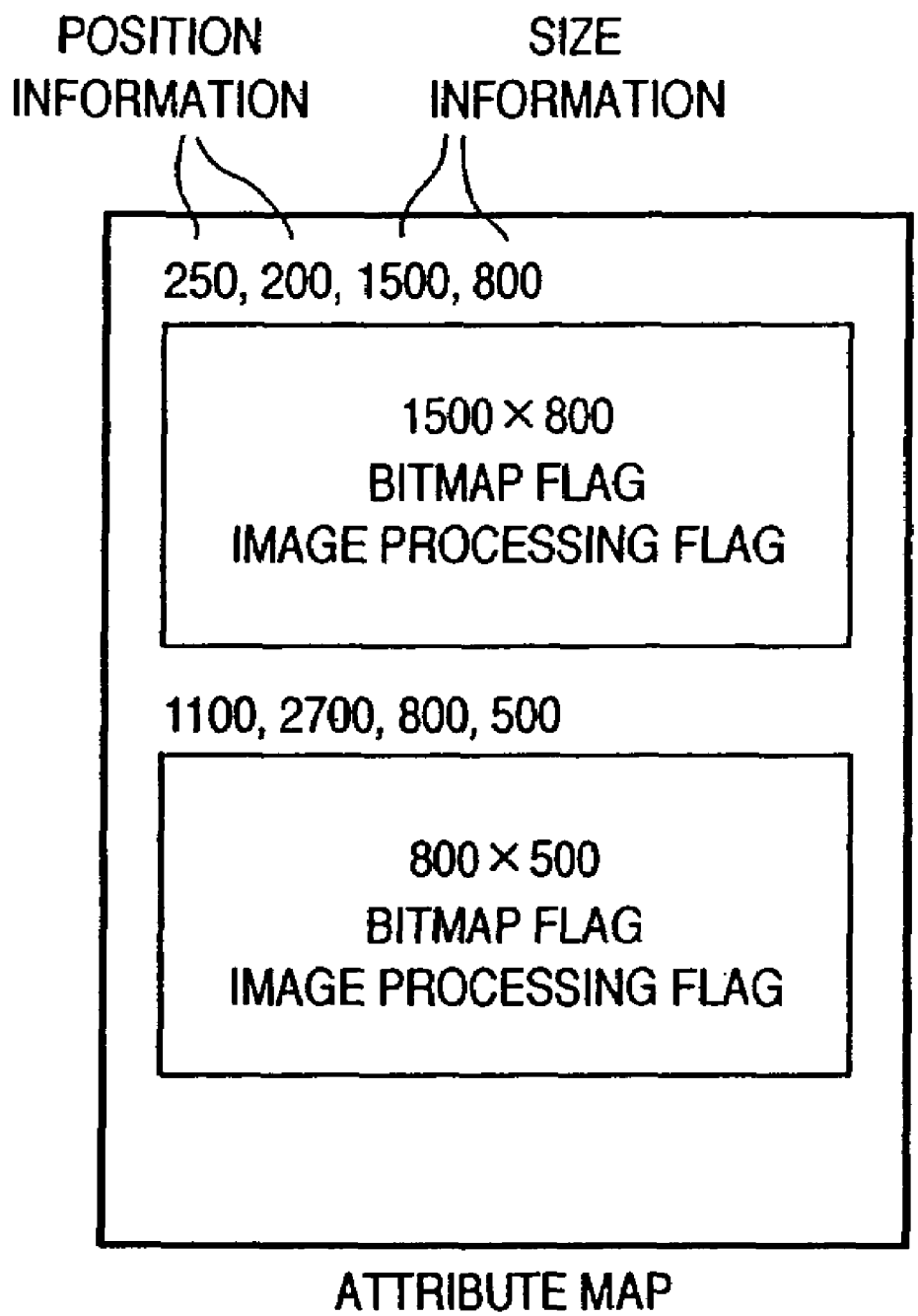
FIG. 6 is a view showing the structure of an attribute map according to the second embodiment.

The second embodiment of the present invention will be described in detail with reference to FIGS. 5 and 6. The same reference numerals as in the first embodiment denote the same functional parts, and a description thereof will be omitted.

In the second embodiment, the attribute map has position information of an image object formed from a bitmap object, size information including a width and length, a 5-bit bitmap flag corresponding to the size information, and an image processing flag for each color. For example, an image as shown in FIG. 5 is formed from objects 35 and 36 generated from bitmap objects. In this case, the attribute map has a structure as shown in FIG. 6. That is, the attribute map holds only bitmap objects, and the positions and sizes of the bitmap objects in the entire image are separately held.

Figure 7:
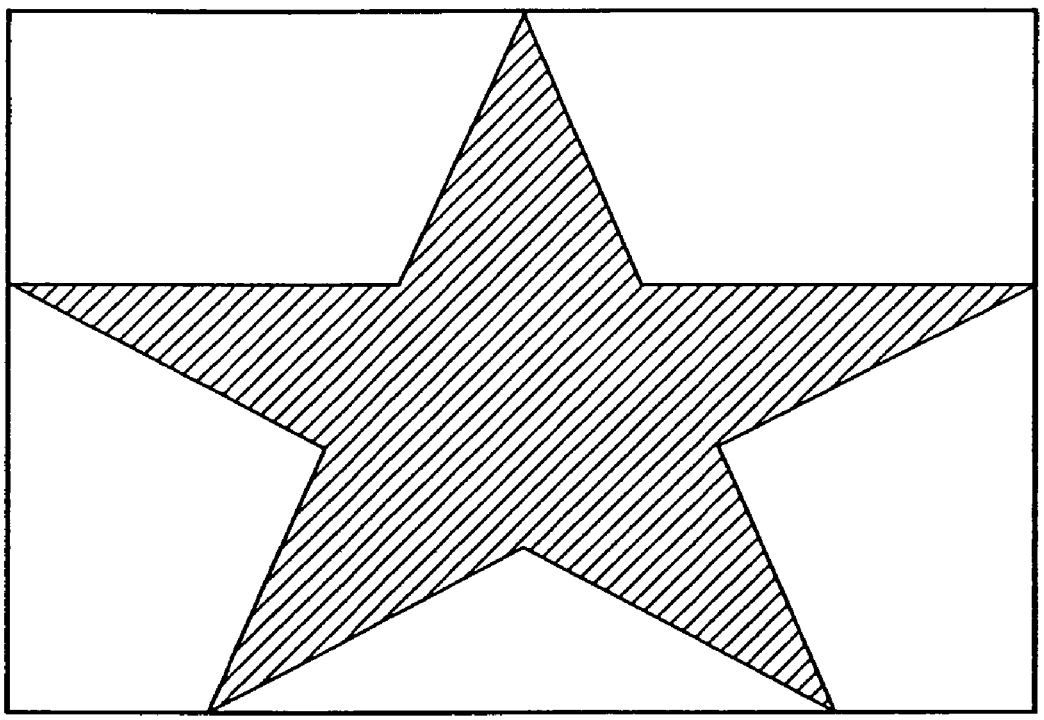
FIG. 7 is a view showing a state in which image data generated from a bitmap object having a complicated shape is enclosed in a rectangle.

When bitmap image data formed from a bitmap object has a complicated shape, position information and size information of a minimum rectangle containing an image formed from the bitmap object, as shown in FIG. 7, are stored (in a memory, hard disk, or the like), and a shape formed from the bitmap object in the bitmap flag is stored. When one image has a plurality of portions formed from bitmap objects, sets of position information, size information, bitmap flags, and image processing flags of the portions are created in correspondence with the respective portions. In FIG. 6, attribute maps corresponding to the objects 35 and 36 in FIG. 5 are created. When image data does not contain any portion formed from a bitmap object, 0 is written in both position information and size information of the attribute map to represent the absence of any bitmap object.

An image area separation processing unit 31 extracts an area formed from a bitmap object, from bitmap image data in accordance with position information of the attribute map. The image area separation processing unit 31 separates a noise-containing area for each color, and sets the image processing flag of each color to 1. At the end of image area separation processing, an image processing unit 32 performs halftone processing in accordance with the image processing flag of each color in the attribute map by using large-matrix-size dither for a highlight portion at which the image processing flag is 1, i.e., a noise component is superposed, and small-matrix-size dither for image data corresponding to an image processing flag of 0, similar to the first embodiment. An engine section 1002 outputs an image.

In the first embodiment, when only part of an output image is formed from a bitmap object or no portion is formed from a bitmap object, an attribute map memory corresponding to the size of an output image is ensured, and a large memory capacity is always required. Further, the image area separation processing unit 31 takes a long processing time because it cannot determine a portion formed from a bitmap object unless the entire attribute map memory is checked.

To prevent this, the second embodiment determines the position and size of a bitmap object in advance, and performs image area separation processing for only this portion. When a portion formed from a bitmap object is small, the memory and processing time can be saved. In addition, the quality of an output image can be increased, similar to the first embodiment.

Third Embodiment

The third embodiment of the present invention will be described. The third embodiment is characterized by using in PWM processing a triangular wave whose cycle is longer at a noise-containing highlight portion in comparison with the remaining portion. In the third embodiment, no combination of matrices is applied in dither processing, unlike the first and second embodiments. In the third embodiment, for example, dither processing uses high-resolution multilevel dithering. PWM in an engine section 1002 adopts a triangular wave with a long cycle for a highlight portion in order to linearly grow a pixel, and a triangular wave with a short cycle for the remaining portion.

Figure 8:
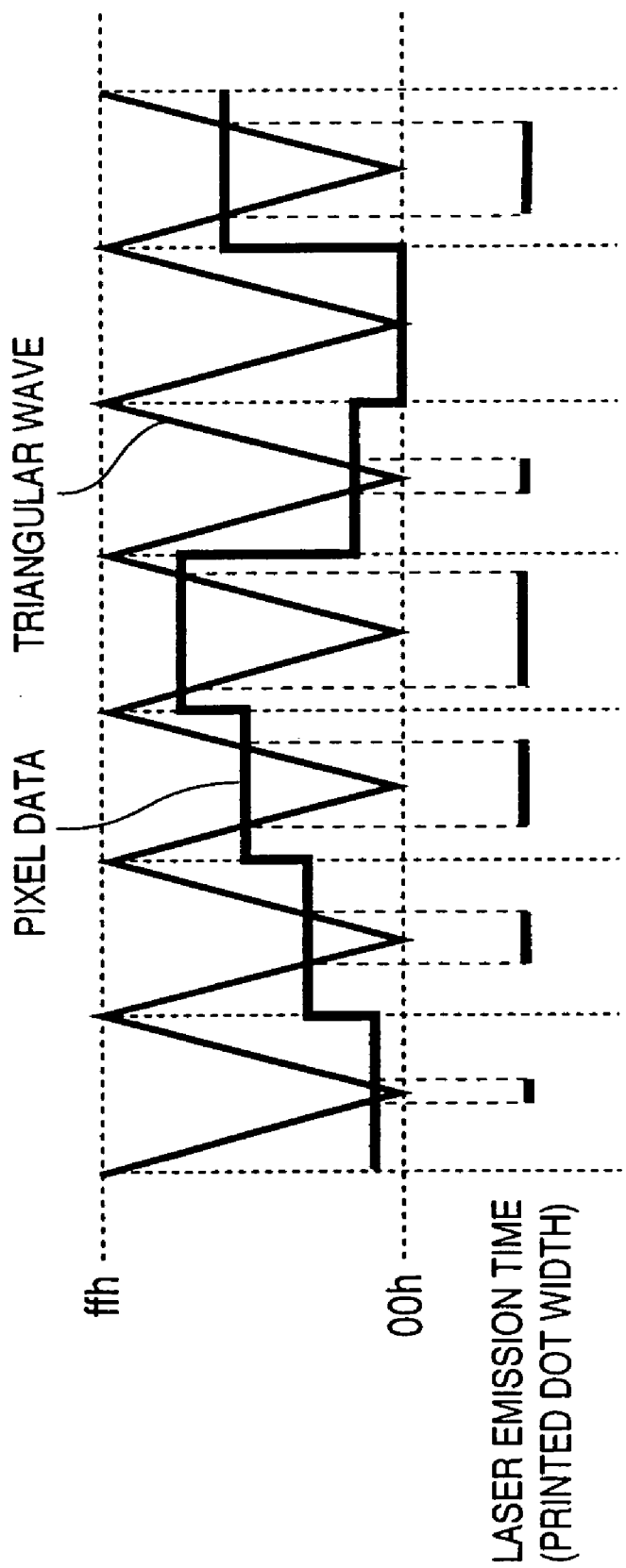
FIG. 8 is a chart showing a PWM principle.
Figure 9:
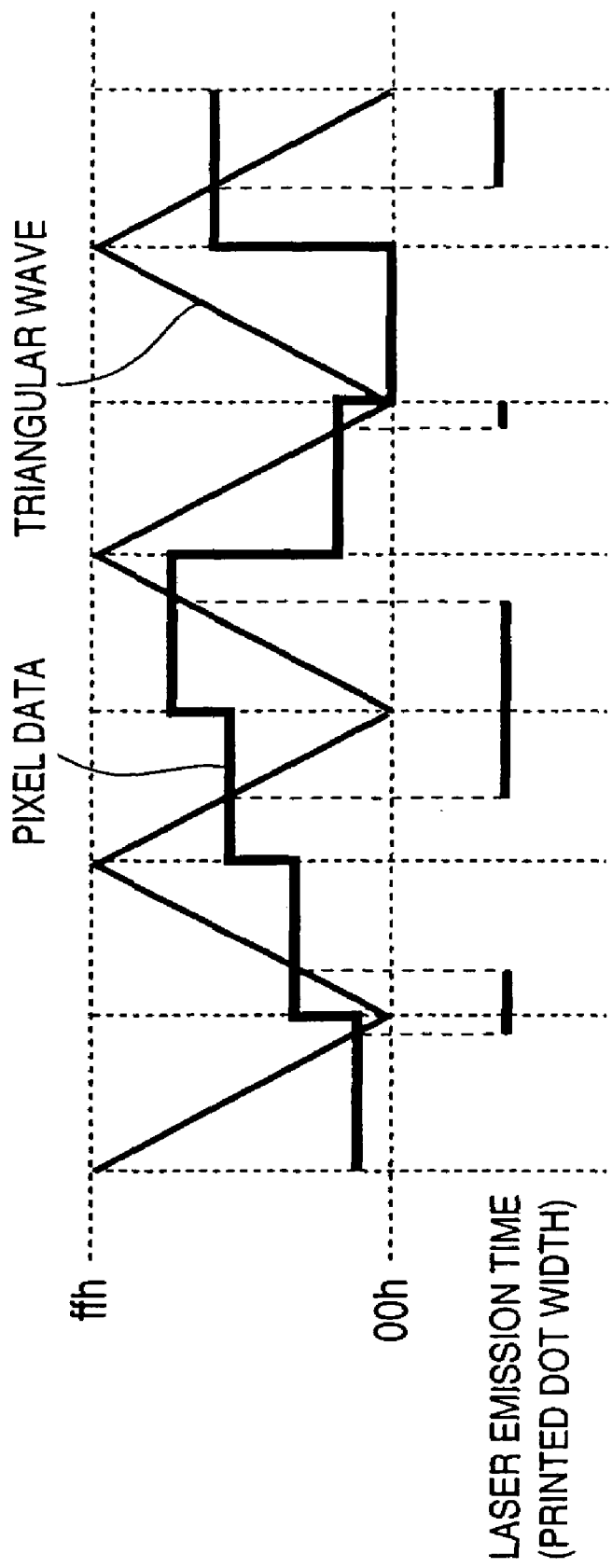
FIG. 9 is a chart showing a PWM principle in which one cycle corresponds to two pixels.
Figure 10:
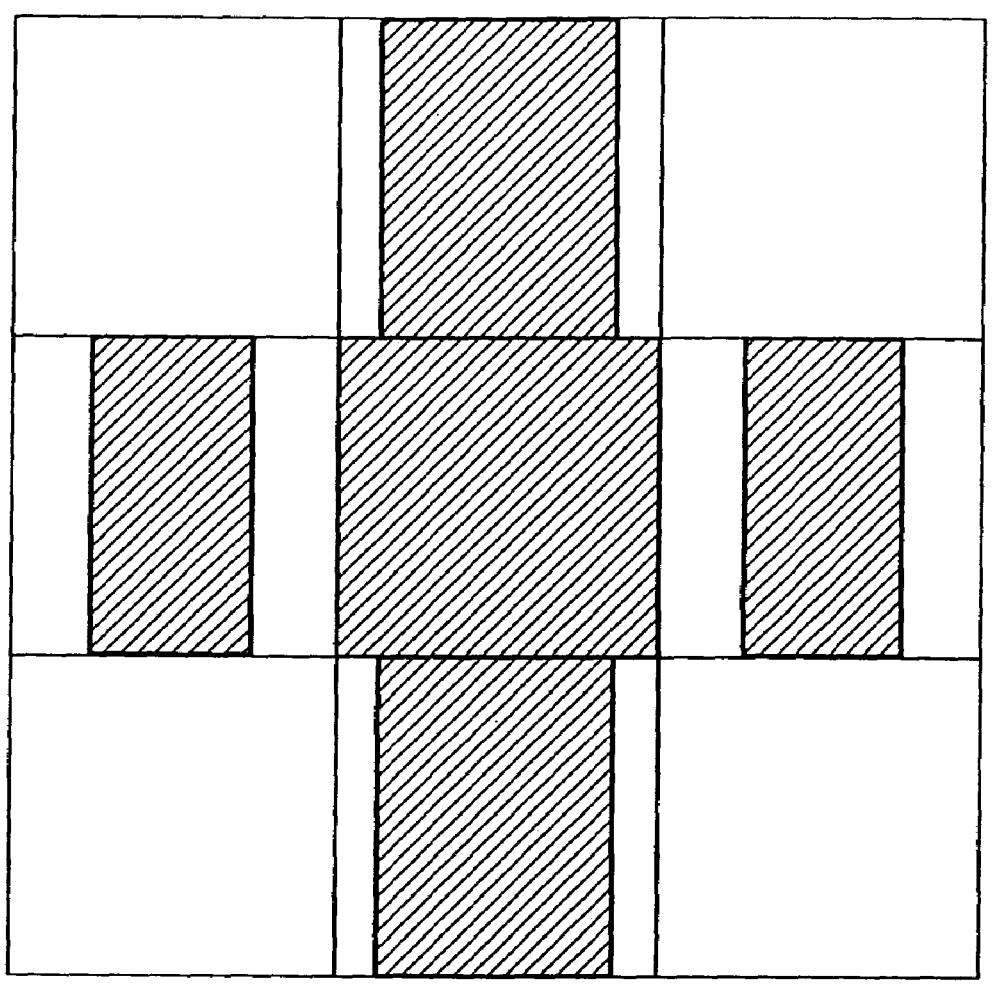
FIG. 10 is a view showing an example of forming grayscale dots using multilevel dithering.

More specifically, a laser beam is modulated using a triangular wave with a long cycle for a highlight portion, as shown in FIG. 9, and a triangular wave with a short cycle for the remaining portion, as shown in FIG. 8. This setting increases the dot size at a highlight portion, and stabilizes the dot reproducibility. The density of a highlight portion hardly varies even in a noise-containing image, and graininess does not stand out. Since the long-cycle triangular wave is used only at a highlight portion, dots can be formed at a resolution obtained by dithering at the remaining portion which requires an expression with high gray level. Hence, the edge of an image object is not jagged, and the image quality does not degrade. With the same resolution, the dot reproducibility tends to be stabilized in a case in which the wavelength of the triangular wave in PWM is increased to increase the dot size, compared to a case in which the dot size is increased using low-resolution multilevel dithering. From this, high-resolution multilevel dithering is used at a noise-free portion, and PWM processing using a long-cycle triangular wave at the same resolution as that of multilevel dithering is used at a noise-containing portion. This allows maintaining the resolution of the entire image.

Control in the third embodiment is not completed by only a controller section 1001, unlike the first and second embodiments. PWM processing is done in the engine section 1002. The controller section 1001 executes attribute flag creation processing shown in FIG. 14, similar to the first or second embodiment. However, dither processing is done using a predetermined matrix, e.g., the high-resolution matrix in FIG. 11A without referring to the attribute map.

The engine section 1002 receives a signal for switching the wavelength of PWM processing between two, long and short wavelengths, and switches the wavelength of the triangular wave in PWM processing in accordance with the signal value.

While an input image processing unit 32 outputs image data of each color component to the engine section 1002, the unit 32 outputs the image processing flag of the attribute map for each color component in synchronism with this. PWM processing is switched in accordance with the image processing flag value of the attribute map.

Alternatively, the controller 1001 can transmit the attribute map together with image data to the engine section 1002, and the engine section 1002 itself can switch the wavelength of the PWM triangular wave in accordance with the image processing flag.

[First Modification to Embodiments]

In the above embodiments, an image data area where graininess readily stands out, i.e., a pixel having image data within an average value range of 0 to 60 is extracted, and the possibility of noise distributed in the pixel is investigated and determined. To the contrary, an area to be investigated/determined can also be restricted depending on the spread of a continuous pixel area. For example, when a pixel having image data within a range of 0 to 60 does not have a predetermined spread, degradation of the image quality cannot be visually recognized or is hardly visually recognized. Thus, only an area where a predetermined number or more of pixels continue undergoes investigation and determination of the noise distribution possibility. This can reduce the processing amount without degrading the image quality.

When a predetermined number or more of pixels continue in a very narrow area, degradation by interference may not appear, or even if it appears, degradation of the quality is hardly visually recognized. An area whose width has a predetermined value or less in addition to the number of pixels of the area is not subjected to investigation and determination of the noise distribution possibility, further reducing the processing amount. In this case, the direction of width can also be limited to the scanning line direction and paper convey direction for simple processing.

[Second Modification to Embodiments]

To determine the noise distribution, the average value and standard deviation of a pixel value are compared with predetermined values. These predetermined values can also be experimentally obtained in correspondence with a plurality of image sensing elements and prepared in advance. That is, the distribution of pixel values at a highlight portion is investigated from an image photographed using a commercially available digital camera or the like, and the relationship between the average value and the scanning direction is obtained.

To determine an error, similar to the first embodiment, the average value-standard deviation characteristic is measured in advance for image sensing elements having different noise distribution characteristics. The average value-standard deviation characteristic is stored in the image forming apparatus in correspondence with the type of image sensing element. Optimal dither processing can be performed for a photographic image photographed by an image sensing element having a different characteristic, improving the image quality.

For example, even when image sensing elements are CCDs, they have different characteristics depending on the manufacturer. When photographing is done using an image sensing element other than a CCD, no dark current noise may be contained. Optimal dither processing can be executed by preparing a plurality of average value-standard deviation characteristics for respective image sensing elements.

Moreover, an arrangement which allows downloading an average value-standard deviation characteristic to the image forming apparatus from a host compute or the like realizes optimal dither processing even for an image sensing element whose characteristic has not been measured and stored in advance.

[Third Modification to Embodiments]

In the above embodiments, input data from a computer is described in the PDL which can identify data for each object. However, the present invention is not limited to this. The description of input data in the PDL allows easily determining the type of object. With this advantage, an area subjected to determination of the presence/absence of noise can be easily limited to a bitmap object.

Except this advantage, the present invention can be applied to input data entirely formed from bitmap data. In this case, an entire image is targeted, instead of only bitmap data generated from a bitmap object in the first to third embodiments. The processing amount increases in comparison with the above-described embodiments, but the same effects can be obtained.

[Fourth Modification to Embodiments]

The image forming apparatus according to the present invention is not limited to the above-described embodiments, and can be variously changed within the range of the gist. That is, the present invention can also be applied to a color image forming apparatus other than the above-mentioned one or a monochrome image forming apparatus. The present invention may be applied to a system comprised of a plurality of devices, or an apparatus formed by one device. The present invention can also be applied when it is achieved by supplying a program to a system or apparatus. In processing by the image area separation processing unit, an image is not only separated into a noise-containing area and the remaining area, but also separated into smaller areas. For example, the image area separation processing unit may perform processing of separating a character image area present in a bitmap object, and use another dither such as binary dither for the character image area.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

As has been described above, the present invention performs halftone processing by decreasing the resolution particularly in a predetermined direction for a highlight area which is contained in an image formed from a bitmap object such as a photographic image and contains a noise component, in comparison with the remaining area. The present invention can always output a high-quality image free from any graininess even when a photographic image is output.

The present invention can eliminate graininess by decreasing the resolution in the light beam scanning direction when an image is formed by electrophotography.

The present invention can eliminate graininess by decreasing the resolution of a noise-containing area by using for the noise-containing area a matrix size which is larger in at least one direction than a matrix size used for a noise-free area especially when halftone processing is done using dithering.

The present invention can eliminate graininess by decreasing the resolution of a noise-containing area by setting the wavelength of a reference signal used for the noise-containing area to be longer than that of a reference signal used for a noise-free area especially when halftone processing is performed by pulse width modulation.

The present invention can eliminate graininess by decreasing the resolution of a noise-containing area by using pulse width modulation for the noise-containing area and dithering for a noise-free area.

The present invention can determine a noise-containing area in a bitmap image.

The present invention can efficiently determine a noise-containing area in a bitmap image for a portion which may contain noise in the image.

Also for a color image, the present invention can form a high-quality image from which graininess is eliminated for each color component.

The present invention is not limited to the above embodiments and various changes and modifications can be made within the spirit and scope of the present invention. Therefore, to apprise the public of the scope of the present invention, the following claims are made.

What is claimed is:

1. An image forming apparatus which forms an image corresponding to bitmap image data, comprising:
   a determination unit which determines from the bitmap image data an image data area where a noise component is superposed; and
   an image processing unit which performs halftone processing for the bitmap image data so as to decrease a resolution in at least a predetermined direction for the image data area where the noise component is superposed, in comparison with an image data area where no noise component is superposed.

2. The apparatus according to claim 1, wherein image formation based on the bitmap image data having undergone halftone processing by said image processing unit is performed by electrophotography, and said image processing unit performs halftone processing by using as the predetermined direction a scanning direction in forming a latent image with a light beam.

3. The apparatus according to claim 2, wherein said image processing unit performs halftone processing by pulse width modulation, and uses a reference signal having a longer wavelength for the image data area where the noise component is superposed, in comparison with the image data area where no noise component is superposed.

4. The apparatus according to claim 1, wherein said image processing unit performs halftone processing by dithering, and uses a threshold matrix having a matrix size larger in at least the predetermined direction for the image data area where the noise component is superposed, in comparison with the image data area where no noise component is superposed.

5. The apparatus according to claim 1, wherein said determination unit determines for the bitmap image data an area where a noise component is superposed, in accordance with whether an average value and a standard deviation of a value of a pixel whose value falls within a predetermined range correspond to predetermined values.

6. The apparatus according to claim 1, wherein the image forming apparatus further comprises a rasterizer which generates bitmap data on the basis of input object data, and said determination unit determines an area where a noise component is superposed, for bitmap image data generated from a bitmap object.

7. The apparatus according to claim 1, wherein the bitmap image data is given for each color component, and said determination unit and said image processing unit perform processes for each color component.

8. An image forming apparatus which forms an image corresponding to bitmap image data, comprising:
   a determination unit which determines from the bitmap image data an image data area where a noise component is superposed; and
   an image processing unit which performs halftone processing by pulse width modulation for the image data area where the noise component is superposed and by dithering for an image data area where no noise component is superposed.

9. An image forming method of forming an image corresponding to bitmap image data, comprising:
   a determination step of determining from the bitmap image data an image data area where a noise component is superposed; and
   an image processing step of performing halftone processing for the bitmap image data so as to decrease a resolution in at least a predetermined direction for the image data area where the noise component is superposed, in comparison with an image data area where no noise component is superposed.

10. The method according to claim 9, wherein image formation based on the bitmap image data having undergone halftone processing in the image processing step is performed by electrophotography, and in the image processing step, halftone processing is performed by using as the predetermined direction a scanning direction in forming a latent image with a light beam.

11. The method according to claim 10, wherein in the image processing step, halftone processing is performed by dithering, and a threshold matrix having a matrix size larger in at least the predetermined direction is used for the image data area where the noise component is superposed, in comparison with the image data area where no noise component is superposed.

12. The method according to claim 10, wherein in the image processing step, halftone processing is performed by pulse width modulation, and a reference signal having a longer wavelength is used for the image data area where the noise component is superposed, in comparison with the image data area where no noise component is superposed.

13. The method according to claim 9, wherein in the determination step, an area where a noise component is superposed is determined for the bitmap image data in accordance with whether an average value and a standard deviation of a value of a pixel whose value falls within a predetermined range correspond to predetermined values.

14. The method according to claim 9, wherein the image forming method further comprises a rasterization step of generating bitmap data on the basis of input object data, and in the determination step, an area where a noise component is superposed is determined for bitmap image data generated from a bitmap object.

15. The method according to claim 9, wherein the bitmap image data is given for each color component, and in the determination step and the image processing step, processes are performed for each color component.

16. An image forming method of forming an image corresponding to bitmap image data, comprising:
   a determination step of determining from the bitmap image data an image data area where a noise component is superposed; and
   an image processing step of performing halftone processing by pulse width modulation for the image data area where the noise component is superposed and by dithering for an image data area where no noise component is superposed.

17. A computer program product which records a program for forming an image corresponding to bitmap image data, wherein the program comprises
   a code for a determination step of determining from the bitmap image data an image data area where a noise component is superposed; and
   a code for an image processing step of performing halftone processing for the bitmap image data so as to decrease a resolution in at least a predetermined direction for the image data area where the noise component is superposed, in comparison with an image data area where no noise component is superposed.

18. The product according to claim 17, wherein image formation based on the bitmap image data having undergone halftone processing in the image processing step is performed by electrophotography, and in the image processing step, halftone processing is performed by using as the predetermined direction a scanning direction in forming a latent image with a light beam.

19. The product according to claim 18, wherein in the image processing step, halftone processing is performed by dithering, and a threshold matrix having a matrix size larger in at least the predetermined direction is used for the image data area where the noise component is superposed, in comparison with the image data area where no noise component is superposed.

20. The product according to claim 18, wherein in the image processing step, halftone processing is performed by pulse width modulation, and a reference signal having a longer wavelength is used for the image data area where the noise component is superposed, in comparison with the image data area where no noise component is superposed.

21. The product according to claim 17, wherein in the determination step, an area where a noise component is superposed is determined for the bitmap image data in accordance with whether an average value and a standard deviation of a value of a pixel whose value falls within a predetermined range correspond to predetermined values.

22. The product according to claim 17, wherein the program further comprises a code for a rasterization step of generating bitmap data on the basis of input object data, and in the determination step, an area where a noise component is superposed is determined for bitmap image data generated from a bitmap object.

23. The product according to claim 17, wherein the bitmap image data is given for each color component, and in the determination step and the image processing step, processes are performed for each color component.

24. A computer program product which records a program for forming an image corresponding to bitmap image data, wherein the program comprises
   a code for a determination step of determining from the bitmap image data an image data area where a noise component is superposed; and
   a code for an image processing step of performing halftone processing by pulse width modulation for the image data area where the noise component is superposed and by dithering for an image data area where no noise component is superposed.

* * * * *

UNITED STATES PATENT AND TRADEMARK OFFICE
CERTIFICATE OF CORRECTION

| | |
|---|---|
| PATENT NO. | : 7,116,445 B2 |
| APPLICATION NO. | : 10/770537 |
| DATED | : October 3, 2006 |
| INVENTOR(S) | : Akihiko Uchiyama et al. |

It is certified that error appears in the above-identified patent and that said Letters Patent is hereby corrected as shown below:

<u>COLUMN 1</u>

Line 21, "remarkably" should read --recently--.

<u>COLUMN 3</u>

Line 32, "comprises" should read --comprises:--.

<u>COLUMN 6</u>

Line 54, "with carrying" should read --when carrying--.

<u>COLUMN 15</u>

Line 35, "compute" should read --computer--.

<u>COLUMN 16</u>

Line 10, "system"should read --a system--.
    Line 30, "Example" should read --Examples--.

<u>COLUMN 19</u>

Line 35, "comprises" should read --comprises:--.

UNITED STATES PATENT AND TRADEMARK OFFICE
CERTIFICATE OF CORRECTION

PATENT NO. : 7,116,445 B2
APPLICATION NO. : 10/770537
DATED : October 3, 2006
INVENTOR(S) : Akihiko Uchiyama et al.

It is certified that error appears in the above-identified patent and that said Letters Patent is hereby corrected as shown below:

COLUMN 20

Line 36, "comprises" should read --comprises:--.

Signed and Sealed this

Twelfth Day of June, 2007

JON W. DUDAS
*Director of the United States Patent and Trademark Office*